Feb. 6, 1962   F. W. DANIELS   3,020,182
CERAMIC-TO-METAL SEAL AND METHOD OF MAKING THE SAME
Filed Sept. 26, 1958
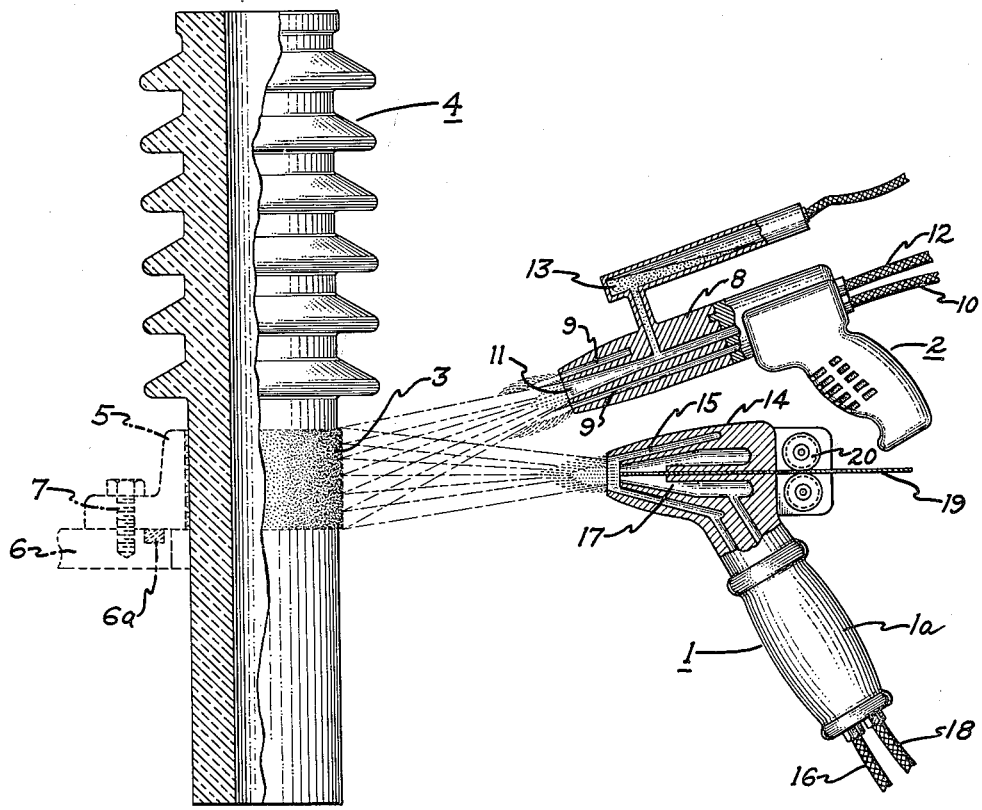
Inventor,
Franklin W. Daniels,
by Gilbert P. Tarleton
His Attorney.

United States Patent Office 3,020,182
Patented Feb. 6, 1962

3,020,182
CERAMIC-TO-METAL SEAL AND METHOD OF MAKING THE SAME
Franklin W. Daniels, Pittsfield, Mass., assignor to General Electric Company, a corporation of New York
Filed Sept. 26, 1958, Ser. No. 763,573
7 Claims. (Cl. 154—43)

The present invention relates to ceramic-to-metal seals, and more particularly concerns an improved process of coating ceramic parts preparatory to joining a metallic part to the ceramic part by means of a fluid-tight seal.

The known methods of making ceramic-to-metal seals are subject to various drawbacks. In some cases, the seal produced has not been sufficiently fluid-tight or has not satisfactorily resisted mechanical or thermal shock. In other cases, the sealing processes have been cumbersome and costly. Commonly known methods using titanium-containing braze alloys, for example, usually must be carried out in a vacuum or in inert or reducing atmospheres, and require the use of expensive and elaborate equipment. In the case of a known method wherein sealing paste is brushed on the ceramic part and fired, long heating and cooling cycles are usually necessary to provide an effective bond and to avoid undue internal strain in the ceramic body. The numerous steps normally required by the prior methods to provide seals of satisfactory strength and tightness also contribute to the excessive labor, time, and high cost attendant on such methods.

It is an object of the present invention to provide an improved ceramic-to-metal seal and a method of making the same which overcomes the disadvantages of the prior seal structures and methods.

It is another object of the invention to provide a readily solderable ceramic-to-metal seal structure which is mechanically strong, resistant to thermal shock, and has a high degree of fluid-tightness, and to provide a process for making the same which is relatively simple, inexpensive, and easily carried out.

To attain the above objects, the invention in a broad aspect provides a strongly bonded hermetic seal structure for ceramic-to-metal seals comprising a coating on the ceramic part composed of a mixture of ceramic and metal particles. Preferably, these particles are so applied on the ceramic part that in the composite coating the proportion of the ceramic particles predominates in the portion of the coating immediately adjacent to the ceramic part, while the proportion of the metallic particles predominates on the exposed surface of the coating.

The method provided by the invention for producing the described seal structure comprises, in a broad aspect, spraying ceramic particles simultaneously with molten metallic particles on the ceramic body while changing gradually the relative proportions of the molten ceramic and metallic particles so that at the beginning of the spraying operation the proportion of ceramic particles predominates, where as at the end of the spraying operation the proportion of metallic particles predominates.

The invention will be better understood from the following description taken in conjunction with the accompanying drawing, in which:

The single FIGURE shows a spraying arrangement suitable for carrying out the process of the present invention.

As shown in the drawing, metal spray gun 1 and ceramic spray gun 2 are arranged to direct streams of atomized metal and ceramic particles, respectively, at the same surface region 3 of a ceramic body 4 composed of porcelain or the like. Surface region 3, after being provided with a combined ceramic-metal coating in accordance with the invention, is adapted to have a metal body soldered to it for mounting the bushing on a desired electrical apparatus, such as a transformer. As shown by intermittent lines in the illustrated embodiment, an annular mounting collar 5 may be soldered to the spray-coated surface region 3 and the bushing 4 thereby secured to a transformer tank cover 6, or the like, by bolt means 7 connecting collar 5 to cover 6. Interposed resilient gasket 6a ensures a fluid-tight joint between cover 6 and mounting collar 5.

To prepare porcelain surface region 3 in accordance with the invention for the soldering operation, ceramic material in the form of heated particles is sprayed onto surface region 3 together with a spray of droplets of molten metal, such as copper, in such manner that there is produced on the porcelain surface a strongly bonded, uniform coating having sufficient metal exposed to provide a readily solderable surface.

The means for applying the streams of ceramic and metal particles on the surface of bushing 4 may be of various types and are not restricted to those shown. In the illustrated equipment, ceramic spray gun 2 comprises a head 8 formed with an annular nozzle opening 9 communicating with a supply hose 10 for delivering fuel gas under pressure, such as a mixture of oxygen and acetylene. Passing axially through gun head 8 is channel 11 communicating at its rear end with conduit hose 12 for supplying compressed air. Also opening into channel 11 is a passage connected to hopper 13 for delivering a supply of ceramic particles. In the use of the ceramic spray gun 2, ceramic particles are continuously fed into channel 11 from hopper 13 and propelled outwardly through the nozzle end of channel 11 by compressed air. At the nozzle end, the ceramic particles pass through a flame of burning oxy-acetylene gas issuing from annular opening 9, whereby the ceramic particles become somewhat molten and are spray-deposited in this condition by the force of the compressed air propellant on the surface region 3 of bushing 4.

Metal spray gun 1 comprises head portion 14 formed with an outer annular opening 15 for the passage of compressed air received through supply tube 16 via a passageway in handle 1a, and an inner chamber 17 for receiving via another passageway in the handle a combustible mixture of gases such as acetylene and oxygen from delivery conduit 18. Wire 19, composed of the metal to be spray-deposited on the bushing surface, is fed through an axial passage in head 14, the wire being progressively moved toward the nozzle end of the head by means of feeding mechanism 20. In the metal spraying operation, the leading end of wire 19 is continually moved forward into the center of fuel gas chamber 17 and through the nozzle end where it is melted by the flame of the fuel gas and atomized by the compressed air blast which propels the metal particles toward the bushing surface.

Although manual types of spray guns of a particular construction are shown, it will be understood that the spraying devices may be of any other suitable construction, and may, if desired, be fixed to a stationary support with their nozzles spaced the necessary distance from the surface to be coated. Moreover, the metal spraying and ceramic spraying may be accomplished by means of a single spraying device suitably constructed for this purpose. It is desirable, however, for reasons which will become apparent hereinafter, that the two spraying operations be capable of independent control.

It has been found in accordance with the invention that ceramic-to-metal bonds of superior strength can be made by simultaneously spraying the metal and ceramic particles, as compared to the bonds obtained by a method wherein the ceramic material is initially deposited and thereafter the deposited ceramic layer is metallized.

In an optimum procedure in accordance with the concept of the present invention, ceramic particles alone are initially sprayed onto the ceramic part and then metal particles are sprayed on in a gradually increasing ratio relative to the ceramic particles, and finally the amount of the ceramic particles is gradually reduced in the spraying operation, so that at the end, only metal particles are being sprayed for a short time. In this way, the proportion of ceramic-to-metal particles varies from 100 to 0% outwardly from the ceramic part. It is desirable to keep the outer all-metal region as thin as possible to avoid the thermal stresses which would otherwise result under operating conditions if too thick a metallic layer were applied.

A particularly preferred practical spraying cycle based on the above concept which has produced excellent results consists in first spraying the ceramic particles, e.g., alumina, on the porcelain surface for a short period, e.g., 3–7 seconds, then simultaneously spraying both the metal and ceramic particles on the same surface for about 3–20 seconds and then stopping the ceramic spray to allow the metal spray to continue alone for a very short period of, say, about ½ second. Prior to the spraying process, no special surface preparation of the ceramic body has been found necessary to produce effective seal coatings, other than ensuring that the surface is reasonably clean.

It appears that the simultaneous spraying of the ceramic and metal particles as above described provides for a more intimate contact and mutual bonding between the particles than is afforded by the separate application of the ceramic and metal layers in the manner heretofore employed.

In order to avoid adverse effects on the ceramic body due to thermal shock, it is preferable during the spraying operation to move the ceramic article being coated or the spray device, so as to progressively expose different surface portions of the article to the sprayed stream of particles. In the case where a circular surface, such as surface region 3, is to be coated, it is convenient merely to rotate the part about its axis during the spray-coating operation.

Although not critical for the purposes of the invention, it is preferable as a rule to pre-heat the ceramic body, e.g., to about 300° C., before the spraying procedure. Such pre-heating appears to contribute to the formation of a better bond between the composite coating material and the ceramic surface.

Various types of ceramic materials may be used in conjunction with various types of metallic materials for the spraying method of this invention. For example, in addition to the alumina particles mentioned, finely divided silicates, silica, zirconia and the like may be employed. Among the metals which may be used are copper, brass, steel, aluminum, and many others. The ceramic body to which the coating is applied may be of a composition other than the porcelain disclosed, as, for example, glass, steatite, alumina, or other refractory or ceramic material.

In this connection, the term "ceramic" as used herein is intended to include such materials as porcelain, stoneware, whiteware, glass, pottery, quartz, and other refractory, vitreous and mineral materials.

Numerous types of hardware parts may be effectively soldered or otherwise joined to a ceramic surface coated in accordance with the invention, such as insulator mounting flanges or collars, terminal caps, conductors, and the like, and hardware of various metal compositions including copper, steel, brass and many others may be effectively joined to the ceramic body with the use of the present process.

In joining the metal hardware to the coated ceramic article, any conventional sealing material may be used, such as a lead-tin solder or other commercial solder or brazing material. In a typical soldering procedure, a flux material of known type such as zinc chloride is applied to the spray-coated ceramic body and the part dipped in a molten solder bath for tinning the surface. In the tinning process, temperatures of up to 150° C. can be used without harm to the ceramic body, but for substantially higher temperatures it is preferable prior to the tinning operation to pre-heat the ceramic article to a sufficiently high level, depending on the soldering temperature, to avoid the danger of thermal shock to the ceramic body.

A test was conducted to compare the bond strength of seals produced by the present simultaneous spray process with that produced by a process wherein separate, i.e., consecutive, ceramic and metal spraying steps were used. One group of porcelain test bushings was provided with a seal coating applied by the present simultaneous spray process using the following cycle: 5 seconds—spray with alumina particles, 5 seconds—simultaneous sprays of alumina and copper particles, and then a flash spray of copper particles for 1 second. Another group of similar bushings was coated with separate ceramic and metal layers according to the following cycle: 5 seconds—spray with alumina particles, 5 seconds—spray with copper particles. All the test bushings were 3¼" in diameter and each was rotated about its axis during the spraying operation. In making the comparative bond strength tests, the thus spray-coated bushing surfaces were tinned with a solder material in the manner hereinabove described, and a test rod soldered to each tinned surface. A standard tensile pull test was then applied to separate the rod from each surface. It was found that the average tensile strength of the seals made by the simultaneous spray process in accordance with the invention was 300 lbs. p.s.i., as compared to an average strength of only 115 lbs. p.s.i. of the seals made by the separate spray process.

Comparative tests were also made of the hermetic tightness of the two above types of seals after the parts were subjected to a thermal shock cycle. In this cycle, two bushings of each type of seal, wherein the seal structure joined a metal cap to an open end face of the porcelain bushing, were subjected first to immersion for 10 minutes in water at 96° C. and then immediately quenched for 10 minutes in water at 4° C. After repeated cycles of this nature, the seals were tested for leaks in water at 25° C. for 60 minutes with the application of 40 lbs. of compressed air. After 9 cycles of this thermal shock test, one of the two bushings of the separate spray-coated type developed a leak at the seal, and after 18 cycles the other bushing of this type similarly failed. After 33 cycles of the test, neither of the two bushings of the present simultaneous spray-coated type had developed a leak at the seal.

From the foregoing description, it will be evident that the simultaneous spray procedure in accordance with the present invention provides strong, extremely fluid-tight ceramic-to-metal seals, and makes possible a rapid, low cost sealing process which considerably facilitates the joining of metal hardware to ceramic bodies.

While the present invention has been described with reference to particular embodiments thereof, it will be understand that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. The method of joining a ceramic body to a metal part comprising the steps of spraying molten ceramic particles on the ceramic body while simultaneously spraying therewith a gradually increasing proportion of molten metal particles and while gradually reducing the proportion of molten ceramic particles until only metallic particles are being sprayed on the ceramic body to provide a metal layer of substantial thickness, said spraying being carried out by air blast, and thereafter hermetically joining the metal part to the surface of said metal layer.

2. In the method of making a ceramic-to-metal seal at a desired surface region of a ceramic body, the steps of spraying molten particles of ceramic material on said surface region, immediately thereafter simultaneously spraying molten particles of ceramic and metallic material on said surface region, immediately thereafter spraying molten particles of metallic material on said surface region to provide a solderable metal layer of substantial thickness, said spraying being carried out by air blast, and thereafter hermetically soldering a metal part to the surface of said metal layer.

3. The method of joining a metallic part to a surface of a ceramic body which comprises the steps of spraying molten particles of ceramic material on said surface of the ceramic body, spraying molten metal particles on said surface while continuing to spray molten ceramic particles thereon, thereafter ceasing to spray the molten ceramic particles on said surface while continuing to spray metal particles thereon for a short period to provide a solderable metal layer of substantial thickness, said spraying being carried out by air blast, and thereafter hermetically soldering the metal part to the surface of said metal layer.

4. The method of claim 3, wherein different portions of the surface of the ceramic body are progressively exposed to the application of the sprayed particles during said spraying steps.

5. A joint structure comprising a ceramic body having intimately and fluid-tightly bonded to the surface thereof a coating composed of a mixture of ceramic and metallic particles, wherein the proportion of ceramic particles to metallic particles decreases in a direction outwardly from the surface of the ceramic body to provide a metal layer of substantial thickness, and a metal part having a surface soldered to the surface of said metal layer.

6. A joint structure comprising a ceramic body having intimately and fluid-tightly bonded to the surface thereof a coating composed of a mixture of ceramic and metallic particles, the proportion of ceramic particles to metallic particles in the coating varying from about 100 to 0% in a direction outwardly from the surface of the ceramic body to provide a metal layer of substantial thickness, and a metal part having a surface hermetically soldered to the surface of said metal layer.

7. A ceramic-to-metal seal structure comprising a ceramic body and a metal part having seal surfaces joined together by a composite ceramic metal material therebetween composed of a mixture of ceramic and metallic particles, wherein the proportion of ceramic particles to metallic particles decreases in a direction away from said ceramic body to provide a metal layer of substantial thickness, said metal part being hermetically joined to the surface of said metal layer.

References Cited in the file of this patent

UNITED STATES PATENTS

| | | |
|---|---|---|
| 1,884,665 | Greiner | Oct. 25, 1932 |
| 1,940,814 | Saeger | Dec. 26, 1933 |
| 2,264,152 | Rowland | Nov. 25, 1941 |
| 2,619,432 | Hosmer | Nov. 25, 1952 |
| 2,771,969 | Brownlow | Nov. 27, 1956 |
| 2,852,415 | Colbert et al. | Sept. 16, 1958 |

FOREIGN PATENTS

| | | |
|---|---|---|
| 508,014 | Great Britain | June 20, 1939 |
| 136,080 | Australia | Jan. 26, 1950 |
| 723,842 | Great Britain | Feb. 9, 1955 |